United States Patent
Bialor

(10) Patent No.: US 8,049,355 B2
(45) Date of Patent: Nov. 1, 2011

(54) DEVICE FOR HARNESSING OCEAN WAVE ENERGY FOR GENERATION OF ELECTRICITY

(76) Inventor: Harry Bialor, Brooklyn, NY (US)

( * ) Notice: Subject to any disclaimer, the term of this patent is extended or adjusted under 35 U.S.C. 154(b) by 0 days.

(21) Appl. No.: 12/930,974

(22) Filed: Jan. 21, 2011

(65) Prior Publication Data

US 2011/0121573 A1 May 26, 2011

Related U.S. Application Data

(63) Continuation-in-part of application No. 12/459,851, filed on Sep. 2, 2009, now abandoned.

(51) Int. Cl.
*H02P 9/04* (2006.01)
(52) U.S. Cl. .......................................................... 290/53
(58) Field of Classification Search .................. 290/42, 290/43, 53, 54; 60/398, 495–502; 416/85; 415/3.1; 405/75, 78; 417/330
See application file for complete search history.

(56) References Cited

U.S. PATENT DOCUMENTS

| | | | | |
|---|---|---|---|---|
| 328,447 | A * | 10/1885 | Brady | 290/43 |
| 1,289,533 | A * | 12/1918 | Pelton | 416/6 |
| 1,374,801 | A * | 4/1921 | Antley | 415/151 |
| 4,324,984 | A * | 4/1982 | Borgren | 290/54 |
| 4,816,697 | A * | 3/1989 | Nalbandyan et al. | 290/54 |
| 5,311,064 | A * | 5/1994 | Kumbatovic | 290/53 |
| 7,223,137 | B1 * | 5/2007 | Sosnowski | 440/3 |
| 7,963,112 | B1 * | 6/2011 | Joseph | 60/499 |
| 2009/0115192 | A1 * | 5/2009 | Morrison | 290/53 |
| 2010/0123316 | A1 * | 5/2010 | Fowler | 290/54 |

\* cited by examiner

*Primary Examiner* — Julio Gonzalez

(74) *Attorney, Agent, or Firm* — Aleksandr Smushkovich

(57) ABSTRACT

There is disclosed a hydro-electric generating device comprising a solid plate fixedly supporting two bearings, which bearings rotatably support a shaft, the plate has a cutout fillable with water subjected to wave motions; a turbine fixed on the shaft. The turbine has a plurality of blades disposed in the cutout. The device further comprises a transmission, kinematically connected to the shaft, an electrical generator mounted on the plate and driven by the transmission, and a forklift furnished with wheels. The plate is secured on the forklift, and the forklift provides for a three-dimension adjustment that constitutes relocation of the generating device along the coastal line, displacement of the generating device from and to the current waterline, and vertical displacement of the plate and turbine of the generating device depending upon the current wave height. The device can be supplemented by a mat placeable on the coastal surface.

1 Claim, 2 Drawing Sheets

DEVICE FOR HARNESSING OCEAN WAVE ENERGY FOR GENERATION OF ELECTRICITY

CROSS-REFERENCES TO RELATED APPLICATIONS

This application is a continuation-in-part application of a U.S. patent application Ser. No. 12/459,851 filed on 2 Sep. 2009 now abandoned, whose disclosure is incorporated herein in its entirety by reference. The aforementioned application Ser. No. 12/459,851 is hereby expressly abandoned.

FIELD OF THE INVENTION

The present invention relates to electricity generation devices actuated by ocean or sea waves.

BACKGROUND OF THE INVENTION

Though the related art contains numerous designs of electricity generation devices actuated by ocean or sea waves, many of them possess certain disadvantages, such as being very expensive, having difficulties in mounting, limited possibilities of relocation, etc.

For example, U.S. Pat. No. 5,882,143 teaches: "A low head hydroelectric system for maximizing electrical power generation is disclosed. The hydroelectric system includes a support structure having a rail member adapted to be positioned above a flowing body of water adjacent a low head dam wall. An actuator is mounted to a transfer carriage which is supported for movement along the rail member. When actuated, the actuator moves an arm linearly in a vertical direction. The arm rotatably supports a water wheel including a plurality of vanes for contacting the flowing water. A generator is supported by the arm and is operably connected to the water wheel such that electricity is generated as the water wheel is caused to rotate from impact by the flowing water." In detail, the aforesaid system includes an immovable structure 26 fixedly tied to a dam 16. The structure 26 essentially supports a plurality of rail members 32, and a transfer carriage 36 associated with water wheels 56, which transfer carriage 36 is capable of linear movement along the rail members 32. Thus, the device described in U.S. Pat. No. 5,882,143 does not provide a capability of relocating along the coastal line. U.S. Pat. No. 5,882,143 does not teach any suggestion or motivation to modify the immovable structure described therein, or to combine it with other elements, to produce such relocation capability.

Another U.S. Pat. No. 6,551,053 teaches a floatation device 12 supporting electric generators 20 mechanically connected to two paddle wheels 22 rotated by a water flow. The floatation device 12 is anchored in an area of flowing water. U.S. Pat. No. 6,551,053 also does not teach any suggestion or motivation to modify the anchored structure, or to combine it with other elements, to produce a capability of relocation of the described device.

BRIEF SUMMARY OF THE INVENTION

The present disclosure teaches another type of water wave generator that is not a stationary installation, but instead is a movable installation capable of relocation along the coastal line (first dimension), without anchoring it to a certain coastal point. The installation is also capable of displacement from and to the currently positioned waterline when necessary to adjust to tidal changes of the water level (second dimension). Additionally, the installation is capable of displacement in the vertical direction (third dimension) to adjust to the current wave height.

Therefore, in a preferred embodiment, the inventive hydro-electric generating device comprises: a solid plate fixedly supporting two bearings, which bearings in turn rotatably support a shaft, wherein the plate has a cutout fillable with water subjected to wave motions; a turbine fixedly mounted on the shaft between the bearings, the turbine has a plurality of blades disposed in the region of the cutout; a transmission, including a leading pulley fixedly mounted on the shaft, and a lead pulley kinematically connected to the leading pulley via a belt; an electrical generator mounted on the plate and driven by the lead pulley, and a forklift furnished with wheels; wherein the plate is secured on the forklift, and the forklift provides for a three-dimension adjustment: (a) relocation of the inventive device along the coastal line, (b) displacement of the inventive device from and to the current waterline, and (c) vertical displacement of the plate and turbine of the inventive device depending upon the current wave height.

BRIEF DESCRIPTION OF DRAWINGS

Identical reference numerals on the drawings refer to the same elements on different figures. A newly introduced numeral in the description is enclosed into parentheses.

A SAMPLE PREFERRED EMBODIMENT OF THE PRESENT INVENTION

Figure 1:
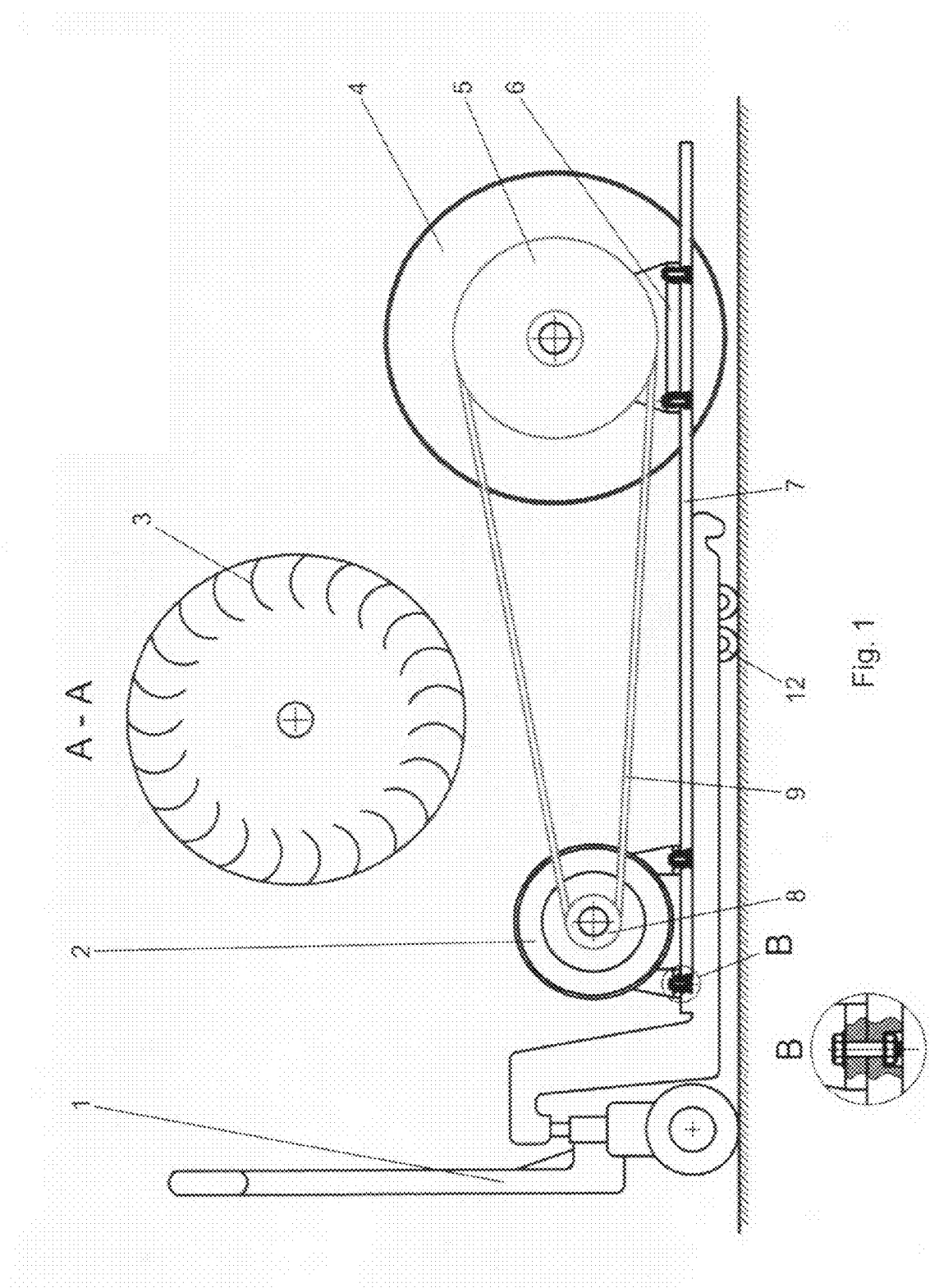
FIG. 1 illustrates a lateral view of the water-wave electrical generator, according to an embodiment of the present invention.

While the invention may be susceptible to embodiment in different forms, there is shown in the drawings, and will be described in detail herein, a specific embodiment of the present invention, with the understanding that the present disclosure is to be considered an exemplification of the principles of the invention, and is not intended to limit the invention to that as illustrated and described herein.

Figure 2:
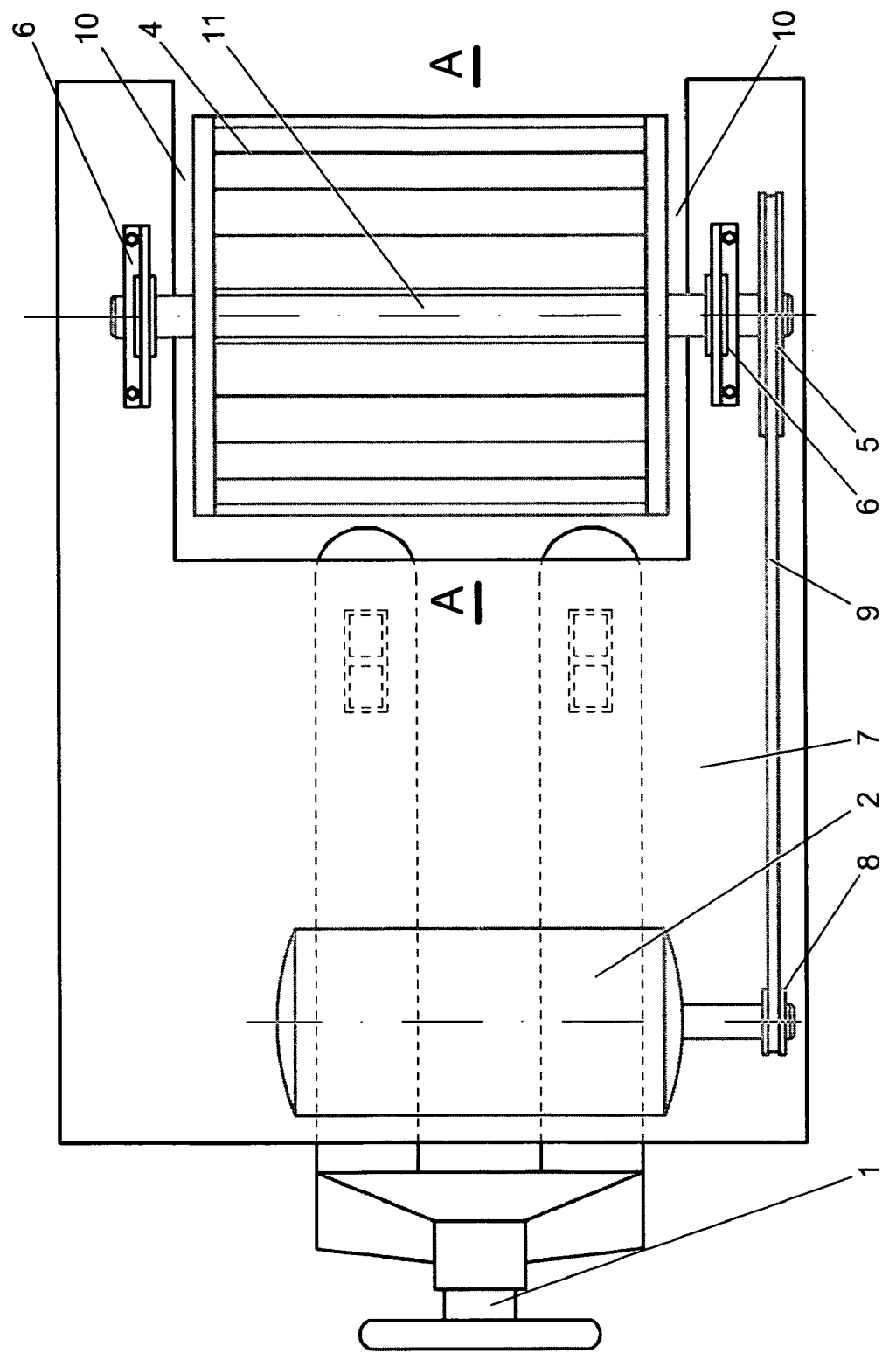
FIG. 2 illustrates a plan view of the water-wave electrical generator, according to the embodiment of the present invention shown on FIG. 1.

A preferred embodiment of the invention is illustrated on FIGS. 1 and 2. The inventive hydro-electric generating device comprises: a solid plate (7) fixedly supporting two bearings (6), the bearings 6 in turn rotatably support a shaft (11), wherein the plate 7 has a cutout (10) fillable with water subjected to wave motions; a turbine (4) fixedly mounted on the shaft 11 between the bearings 6, the turbine 4 has a plurality of blades (3) disposed in the region of the cutout 10; a transmission, including a leading pulley (5) fixedly mounted on the shaft 11, and a lead pulley (8) kinematically connected to the leading pulley 5 via a belt (9); an electrical generator (2) mounted on the plate 7 and driven by the lead pulley 8; and a forklift (1) having preferably two fingers (as shown on FIG. 2) and furnished with wheels (12); wherein the plate 7 is secured on the fingers of forklift 1, and the forklift provides for a three-dimension adjustment: relocation along the coastal line, displacement from and to the current waterline, and vertical displacement of the plate 7 with the turbine 4.

The water waves rotate the turbine 4 that drives the shaft 11, the leading pulley 5, the belt 9, the lead pulley 8, and the electric generator 2, thereby producing electricity. When necessary, the forklift 1 can be rolled into or out of the ocean adjusting to the current tidal level. The forklift can also be elevated or lowered (by jacking or with the help of a known mechanism that is not illustrated) for adjusting the device to the current wave height.

Preferably, the inventive hydro-electric generating device is supplemented by a suitable mat placeable on a coastal surface proximate to the waterline, such that the generating device is capable of moving along the mat closer or further from the waterline, thereby establishing an optimal position essentially depending upon the instant tidal level of water and/or upon the instant height of water waves.

Those skilled in the art will appreciate that the conception, upon which this disclosure is based, may readily be utilized as a basis for the designing of other structures methods and systems for carrying out several purposes of the present invention. It is therefore important that the claims be regarded as including such equivalent constructions insofar as they do not depart from the spirit and scope of the present invention. As opposed to the claims, the foregoing abstract is neither intended to define the invention of the instant application, which is measured by the claims, nor is it intended to be limiting as to the scope of the invention in any way.

I claim:
1. A hydro-electric generating device comprising:
 a solid plate fixedly supporting two bearings, said bearings rotatably support a shaft, said plate has a cutout fillable with water subjected to wave motions coming substantially from a predetermined direction to a costal line, said cutoff has a rectangular-like shape with two closed lateral sides, a rear closed side, and a front open side facing the predetermined direction;
 a turbine fixedly mounted on the shaft between the bearings, said turbine has a plurality of blades disposed in the region of said cutout;
 a transmission kinematically connected to said shaft;
 an electrical generator mounted on the plate and driven by said transmission, and
 a forklift furnished with wheels;
wherein said plate is secured on the forklift, and said forklift provides for a three-dimension adjustment: (a) relocation of said generating device along the coastal line, (b) displacement of said generating device from and to the current waterline, and (c) vertical displacement of the plate and turbine of said generating device depending upon the current wave height.

* * * * *